US012699725B2

(12) United States Patent
Meier et al.

(10) Patent No.: US 12,699,725 B2
(45) **Date of Patent: *Aug. 4, 2026**

(54) HIERARCHICAL DICTIONARY WITH STATISTICAL FILTERING BASED ON WORD FREQUENCY

(71) Applicant: HYLAND SWITZERLAND SÀRL, Corcelles (CH)

(72) Inventors: Ralph Meier, Rastede (DE); Johannes Hausmann, Corcelles (CH); Harry Urbschat, Oldenburg (DE); Thorston Wanschura, Oldenburg (DE)

(73) Assignee: HYLAND SWITZERLAND SÀRL, Corcelles (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,767

(22) Filed: Oct. 28, 2024

(65) Prior Publication Data

US 2025/0094479 A1     Mar. 20, 2025

Related U.S. Application Data

(63) Continuation of application No. 17/175,254, filed on Feb. 12, 2021, now Pat. No. 12,130,854, which is a
(Continued)

(51) Int. Cl.
*G06F 16/36* (2019.01)
*G06F 16/31* (2019.01)
*G06F 16/335* (2019.01)

(52) U.S. Cl.
CPC ............ *G06F 16/36* (2019.01); *G06F 16/313* (2019.01); *G06F 16/335* (2019.01)

(58) Field of Classification Search
CPC ....... G06F 16/36; G06F 16/313; G06F 16/335
See application file for complete search history.

(56) References Cited

U.S. PATENT DOCUMENTS 5,704,060 A    12/1997 Del Monte
5,706,462 A    1/1998 Matousek
(Continued)

OTHER PUBLICATIONS

Zobel, Justin, Steffen Heinz, and Hugh E. Williams. "In-memory hash tables for accumulating text vocabularies." Information Processing Letters 80.6 (2001): 271-277. (Year: 2001).*
(Continued)

*Primary Examiner* — Mohsen Almani
(74) *Attorney, Agent, or Firm* — Eschweiler & Potashnik, LLC

(57) ABSTRACT

A hierarchical dictionary having methods of storing words based on frequency thereof in one or more documents which includes the steps of identifying a hash value corresponding to an inputted word; storing the word in a first hash map and in a second hash map having a substantially larger word storage capacity than the first hash map based on the identified hash value; clearing the first hash map at every predetermined period or triggering event; determining whether a frequency of the word as stored in the second hash map exceeds a predetermined value; and if so, promoting the word from the second hash map to a third hash map having a substantially larger word storage capacity than the second hash map for long-term storage and later retrieval.

20 Claims, 4 Drawing Sheets

Related U.S. Application Data continuation of application No. 15/395,778, filed on Dec. 30, 2016, now Pat. No. 10,922,347.

(60) Provisional application No. 62/288,032, filed on Jan. 28, 2016.

(56) References Cited

U.S. PATENT DOCUMENTS

| | | | |
|---|---|---|---|
| 6,292,880 | B1 | 9/2001 | Mattis et al. |
| 7,058,639 | B1 | 6/2006 | Chatterjee et al. |
| 8,653,993 | B2 | 2/2014 | Bendel et al. |
| 8,725,779 | B1 | 5/2014 | Grzywinski |
| 10,922,347 | B2 | 2/2021 | Meier et al. |
| 12,619,651 | B2 | 5/2026 | Meier et al. |
| 2006/0171588 | A1 | 8/2006 | Chellapilla et al. |
| 2009/0089048 | A1 | 4/2009 | Pouzin |
| 2010/0011028 | A1 | 1/2010 | Dade |
| 2010/0115046 | A1 | 5/2010 | Reddy et al. |
| 2010/0235606 | A1 | 9/2010 | Oreland et al. |
| 2011/0043387 | A1* | 2/2011 | Abali .................. H03M 7/3088 341/51 |
| 2012/0173833 | A1 | 7/2012 | Lehr |
| 2013/0275677 | A1 | 10/2013 | Kpyanagi et al. |
| 2014/0201126 | A1 | 7/2014 | Zadeh et al. |
| 2014/0223030 | A1 | 8/2014 | Bhaskar et al. |
| 2016/0182373 | A1 | 6/2016 | Wang |
| 2017/0011093 | A1 | 1/2017 | LeCompte |
| 2017/0024276 | A1 | 1/2017 | Kanno |
| 2018/0027123 | A1 | 1/2018 | Cartwright et al. |
| 2019/0129972 | A1 | 5/2019 | Borate et al. |
| 2021/0165814 | A1 | 6/2021 | Meier et al. |

OTHER PUBLICATIONS

Metreveli, Zviad, Nickolai Zeldovich, and M. Frans Kaashoek. "Cphash: A cache-partitioned hash table." ACM SIGPLAN Notices 47.8 (2012): 319-320. (Year: 2012).*

Zukowski, John. "Java Collections Framework: An Overview." Java™ Collections (2001): 1-5. (Year: 2001).*

Almani, Mohsen, "Office Action for U.S. Appl. No. 15/395,778", Mailed Date: Jan. 27, 2020, 14 pages.

Teng, et al., "A Regression-Based Temporal Pattern Mining Scheme for Data Streams", In Proceedings of the 29th VLDB Conference, 2003, 12 pages.

Datar, et al., "Maintaining Stream Statistics Over Sliding Windows", In Society for Industrial and Applied Mathematics, vol. 31, No. 6, 2002, pp. 1794-1813.

Almani, Mohsen, "Notice of Allowance for U.S. Appl. No. 15/395,778", Mailed Date: Oct. 15, 2020, 7 pages.

Osca, Alexander, and Elaine PM de Sousa. "An Adaptive Multi-level Hashing Structure for Fast Approximate Similarity Search." 2010. (Year: 2010).

Knott, Gary D. "Expandable open addressing hash table storage and retrieval." Proceedings of the 1971 ACM SIGFIDET (now SIGMOD) Workshop on Data Description, Access and Control. 1971. (Year: 1971).

techopedia.com, persistence definition, https://www.techopedia.com/definition/8842/persistence-computing. (Year: 2014).

Almani, Mohsen, "Office Action for U.S. Appl. No. 17/175,254", Mailed Date: Mar. 31, 2022, 19 pages.

Almani, Mohsen, "Final Office Action for U.S. Appl. No. 17/175,254", Mailed Date: Oct. 12, 2022, 20 pages.

Almani, Mohsen, "Office Action for U.S. Appl. No. 17/175,254", Mailed Date: Mar. 20, 2023, 22 pages.

Almani, Mohsen, "Final Office Action for U.S. Appl. No. 17/175,254", Mailed Date: Sep. 26, 2023, 21 pages.

Almani, Mohsen, "Office Action for U.S. Appl. No. 17/175,254", Mailed Date: Feb. 20, 2024, 22 pages.

Almani, Mohsen, "Notice of Allowance for U.S. Appl. No. 17/175,254", Mailed Date: Jul. 3, 2024, 7 pages.

Anand, Ashok, et al. "Cheap and Large CAMs for High Performance Data-Intensive Networked Systems." NSDI. vol. 10. 2010 (Year: 2010).

Almani, Mohsen, "Office Action for U.S. Appl. No. 17/175,288", Mailed Date: Oct. 24, 2022, 18 pages.

Almani, Mohsen, "Final Office Action for U.S. Appl. No. 17/175,288", Mailed Date: Mar. 30, 2023, 18 pages.

Almani, Mohsen, "Office Action for U.S. Appl. No. 17/175,288", Mailed Date: Sep. 14, 2023, 19 pages.

Almani, Mohsen, "Final Office Action for U.S. Appl. No. 17/175,288", Mailed Date: Apr. 3, 2024, 21 pages.

Almani, Mohsen, "Notice of Allowance for U.S. Appl. No. 17/175,288", Mailed Date: Sep. 10, 2024, 8 pages.

* cited by examiner

HIERARCHICAL DICTIONARY WITH STATISTICAL FILTERING BASED ON WORD FREQUENCY

CROSS REFERENCE TO RELATED APPLICATIONS

This application is a continuation of U.S. patent application Ser. No. 15/395,778 ("the '778 application"), filed on Dec. 30, 2016, and entitled "HIERARCHICAL DICTION-ARY WITH STATISTICAL FILTERING BASED ON WORD FREQUENCY" and which issued as U.S. Pat. No. 10,922,347 on Feb. 16, 2021. The '778 application claims priority to U.S. Provisional Patent Application No. 62/288,032 ("the '032 application"), filed on Jan. 28, 2016, and entitled "Hierarchical Dictionary with Statistical Filtering Used for Automatic Online Extraction Value Validation". Both the '778 application and the '032 application are incorporated in their entireties herein by reference.

STATEMENT REGARDING FEDERALLY SPONSORED RESEARCH OR DEVELOPMENT

None.

REFERENCE TO SEQUENTIAL LISTING, ETC

None.

BACKGROUND

1. Technical Field

The present disclosure pertains to a dictionary having methods for storing words, and more particularly to, a hierarchical dictionary generally having short, medium, and long-term storage layers as filtered based on frequency.

2. Description of the Related Art

Humans have an implicit ability to spot errors i.e., mis-spellings, within text despite the fact that they do not explicitly know all words possible within specific documents or might read a word or a phrase for the first time. For example, within the phrase "PHYSICS EDU POLE VLT" a human reader can spot the mixture of two words: "Physics Education" and "Pole Vault". A well-grounded understanding of words is typically formed by learning and exposure.

In creating dictionaries, words are often assigned to a particular unique identifier. These types of dictionaries, however, not only take up a substantial amount of memory as more words are added overtime but also lack meaning, as they are incapable of giving users a view of how words are used in processed documents. Accordingly, there is a need for a system and methods of storing words into a dictionary which mimics a human brain's capability of storing words at a short or long term basis depending on a number of times a word has been used.

SUMMARY

A system and methods for organizing a set of words associated with one or more documents based on frequency are disclosed.

A hierarchical dictionary stored in a memory and com-municatively coupled to one or more applications in a computing device may include a first layer of data structure for storing a first set words associated with a portion of a document, a second layer of data structure for storing a second set of words including the first set of words and corresponding frequencies thereof in the document, and a third layer of data structure for storing a third set of words from the second set of words exceeding a predetermined frequency limit. All of the first, second, and third layer of data structures may be implemented as hash maps and may be treated as independent dictionaries.

The first set of words stored in the first data structure may be swiped clean following a predetermined period or a triggering event. The second data structure acts as a filter for promoting a set of words from the first data structure exceeding a predetermined frequency limit to the third data structure or for retaining the set of words therein. The third data structure, when receiving words from the second data structure, may store words at a substantially longer period of time in the memory coupled to or integral with the comput-ing device relative to being stored in the first and second data structures.

In one example embodiment, a method for storing words associated with a document includes: identifying a hash value associated with each word; storing in the first and second hash maps the word to a bucket position associated with the identified hash value; following a predetermined period of time, determining whether a frequency of the word exceeded a predetermined frequency limit; and promoting the word to a next layer of data structure upon a positive determination that the predetermined frequency limit for the word has been exceeded.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodi-ments taken in conjunction with the accompanying draw-ings. Like reference numerals are used to indicate the same element throughout the specification.

DETAILED DESCRIPTION OF THE DRAWINGS

Figure 1:
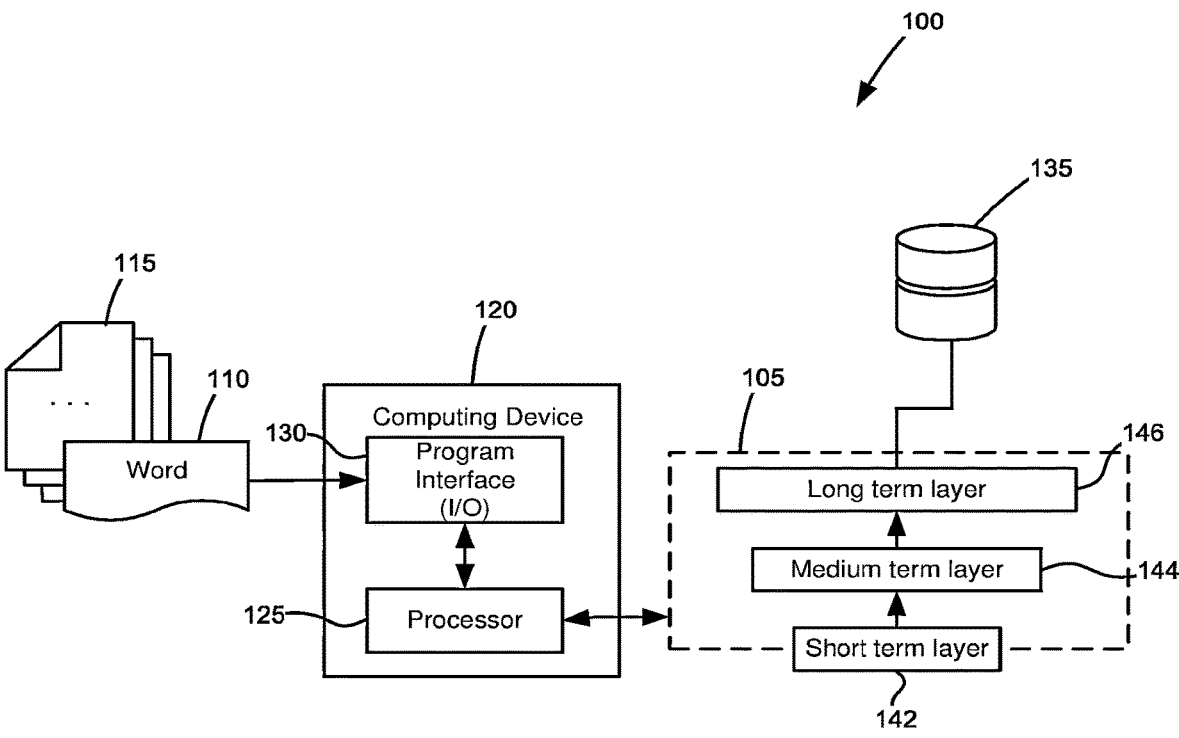
FIG. 1 is a system including a hierarchical dictionary for storing a set of words from one or more documents, accord-ing to an example embodiment.

It is to be understood that the disclosure is not limited to the details of construction and the arrangement of compo-nents set forth in the following description or illustrated in the drawings. The disclosure is capable of other example embodiments and of being practiced or of being carried out in various ways. For example, other example embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the disclosure encompasses the appended claims and all available equivalents. The following description is therefore, not to be taken in a limited sense, and the scope of the present disclosure is defined by the appended claims.

Also, it is to be understood that the phraseology and terminology used herein is for the purpose of description and should not be regarded as limiting. The use herein of "including", "comprising", or "having" and variations thereof is meant to encompass the items listed thereafter and equivalents thereof as well as additional items. Further, the use of the terms "a" and "an" herein do not denote a limitation of quantity but rather denote the presence of at least one of the referenced item.

In addition, it should be understood that example embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other data processing apparatus may create means for implementing the functionality of each block or combinations of blocks in the diagrams discussed in detail in the description below.

These computer program instructions may also be stored in a non-transitory computer-readable medium that may direct a computer or other programmable data processing apparatus to function in a particular manner, such that the instructions stored in the computer-readable medium may produce an article of manufacture, including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are a hierarchical dictionary and methods for organizing a set of words based upon a frequency thereof in a document. The hierarchical dictionary includes short term, medium term, and long term dictionaries and includes instructions for performing methods where the propagation of words as inputted from the short term dictionary towards the long term dictionary via the medium term dictionary is controlled by word frequency and insertion over time, as will be discussed in greater detail below.

It is to be noted that the term "dictionary" and "word" does not limit the content that can be inserted and searched for to text content. The "dictionary" referred to herein includes functions that are the same as that of normal dictionaries, such as, for example, insertion and removal of words, getting the relative frequencies of stored words, word lookup, and the like. Also, a "word" may refer to other forms of data, such as, but not limited to phrases, images, sounds, and other forms which can be represented in a data type that is implemented within the dictionary. Other types of data format in a document besides text which can be stored and searched for in a dictionary may be apparent in the art.

FIG. 1 shows one example embodiment of a system 100 including a hierarchical dictionary 105 for storing a word 110 from one or more documents 115. System 100 further includes a computing device 120 including at least one processor 125 and a program interface 130. While shown as a separate entity, hierarchical dictionary 105 may be stored in a computer-readable storage medium 135 remotely located from computing device 120, in a memory of computing device 120 (not shown), or a combination of both, provided that it is communicatively coupled to processor 125. Hierarchical dictionary 105 includes a short term layer 142, a medium term layer 144, and a long term layer 146. Respective word storage capacities of short term, medium term, long term layers 142, 144, 146 varies based upon a size of data to be processed, i.e., one or more documents 115. In FIG. 1, when any word 110 is entered by a user via program interface 130 for storage or lookup, program interface 130 communicates with processor 125 for the processor to communicate with hierarchical dictionary 105. A number of layers in hierarchical dictionary 105 may not be limited to 3, as shown. In other example embodiments, additional intermediate filtering layers with different sizes and parameters besides medium term layer 144 may be desired. Also, while word 110 is shown as being tied up to one or more documents 115, it will be apparent in the art that word 110 may be standalone and need not necessarily be related to any document 115. Combinations and permutations for the elements in system 100 and other components of computing device 120 may be apparent in the art.

Connections between the aforementioned elements in FIG. 1 depicted by the arrows may be performed in a shared data bus of computing device 120. Alternatively, the connections may be through a network that is capable of allowing communications between two or more remote computing systems, as discussed herein, and/or available or known at the time of the filing, and/or as developed after the time of filing. The network may be, for example, a communications network or network/communications network system such as, but not limited to, a peer-to-peer network, a Local Area Network (LAN), a Wide Area Network (WAN), a public network such as the Internet, a private network, a cellular network, and/or a combination of the foregoing. The network may further be a wireless, a wired, and/or a wireless and wired combination network.

In FIG. 1, hierarchical dictionary 105 may be stored on computer-readable storage medium 135 and include a set of instructions from processor 125 for receiving and performing methods using word 110. In particular, hierarchical dictionary 105 includes program instructions for performing a method for organizing a set of words 110 based upon relative frequencies thereof (insert method, FIG. 3) and a method for searching words (lookup method, FIG. 4). While independent in structure and operation, short term, medium term, and long term layers 142, 144, and 146 (collectively referred to as SML layers herein) of hierarchical dictionary 105, are communicatively connected to the other via medium term layer 144. Specifically, short term layer 142 is communicatively connected to long term layer 146 and vice-versa via medium term layer 144. In this manner, medium term layer 144 acts as a filter.

Hierarchical dictionary 105 may be a module or a functional unit for installation onto a computing device and/or for integration to an application such as program interface 130. Each of short term layer 142, medium term layer 144, and long term layer 146, which are also referred to herein as S-layer 142, M-layer 144, and L-layer 146, respectively, may each be implemented as a fixed size hash map, with L-layer 146 having a substantially largest word storage capacity, as will be detailed below with respect to FIG. 2. Other types of data structures besides hash maps may be apparent in the art.

S-layer 142 includes instructions for storing relatively smaller chunk of data within and/or relating to document 115 (e.g., order of the number of words in text of one page, words in a paragraph or document). M-layer 144, also referred to herein as M-layer 144, includes instructions for storing a set of words that are relatively more frequent. In the present disclosure, M-layer 144 further includes instructions for gathering statistics which may be associated, for example, to the usage frequency of word 110 in document 115. Being a statistical filter, M-layer 144 further includes instructions for propagating or transferring word 110 from being stored in S-layer 142 to L-layer 146 and for removing stored words therein, as will be discussed in greater detail below. L-layer 146 includes instructions for receiving words from M-layer 144 for storing word 110 at a relatively longer period of time.

In S-layer 142, word 110 and/or other data relating to document 115 may be stored temporarily. In one aspect, word 110 that are stored in S-layer 142 may be swiped clean by a triggering event, such as, for example, when a new document, paragraph, or page is being processed. A hash map for M-layer 144 may be augmented with a predecessor and a successor in the sense of a doubly linked list for keeping track of the youngest and oldest words that it stores. The data structure in L-layer may include a tree. For purposes of illustration and not by limitation, the general steps for the insertion and lookup method are shown in FIG. 2.

Figure 2:
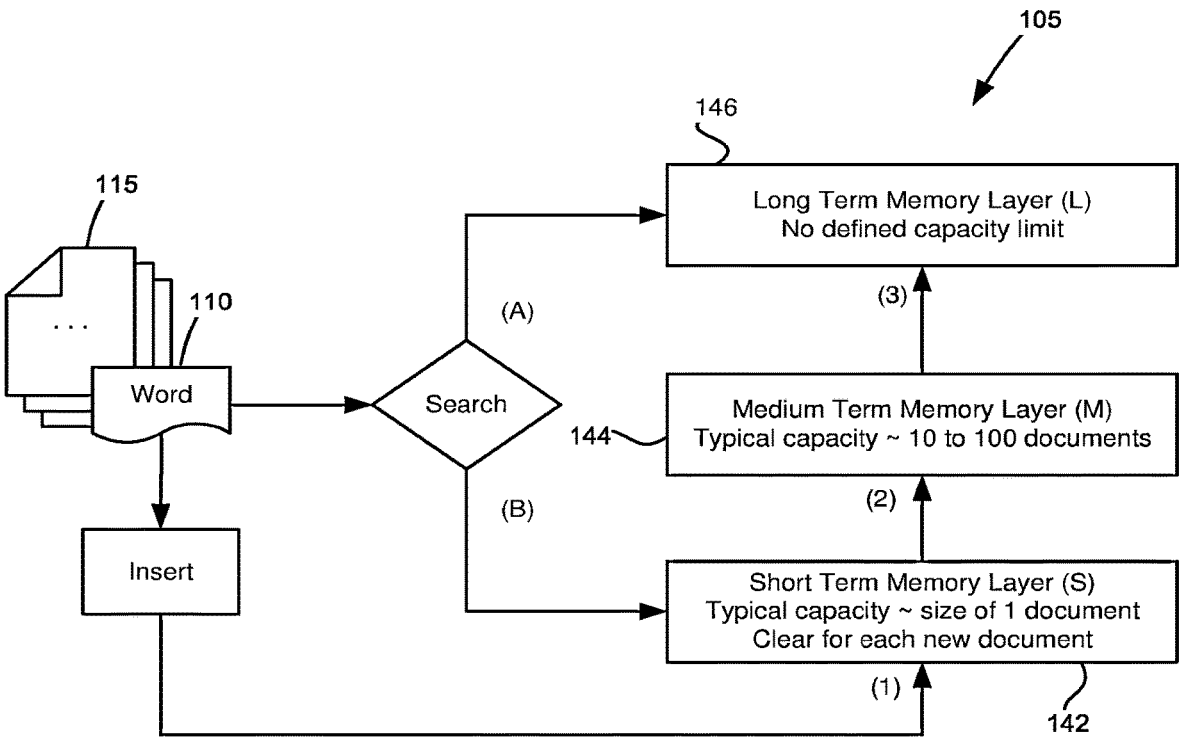
FIG. 2 is a schematic diagram showing a generic set of steps for inserting or searching a word in the hierarchical dictionary in FIG. 1.

FIG. 2 is a schematic diagram showing a generic set of steps for inserting or searching one of word 110 in hierarchical dictionary 105. As shown in FIG. 2, a capacity of S-layer 142 may be set to about a single document 115. To this end, S-layer 142 may be cleared every time a single document 115 is being processed. A capacity of M-layer 144 may be set to about 10 to 100 documents 115 whereas a capacity limit may not be defined for L-layer 146.

In FIG. 2, when inserting a word 110 for storage to hierarchical dictionary 105 and as represented by step 1, a single word 110 is first inserted or stored in S-layer 142. Frequency limits may be predefined within hierarchical dictionary 115 for every one of S-layer 142, M-layer 144, and L-layer 146. In one example embodiment, hierarchical dictionary 105 may include instructions to determine whether a frequency of word 110 has exceeded a first predetermined limit and a second predetermined limit for word 110 to be promoted to M-layer 144 and L-layer 146, respectively. Thus, word 110 may be promoted from S-layer 142 to M-layer 144 when the first predetermined limit has been exceeded (step 2). Following a period of time that the same word 110 has been repeatedly inserted or stored to hierarchical dictionary 105 and when a frequency of word 110 has exceeded the second predetermined limit, word 110 may then be promoted from M-layer 144 to L-layer 146 for relatively longer term storage. In setting frequency limits prior promoting word 110 to the higher layers within hierarchical dictionary 105, an input and recall ability of humans may be mimicked.

Alternatively, hierarchical dictionary 105 may include instructions for M-layer 144 to copy word 110 stored in S-layer 1, to track a frequency of each word 110 inserted, and to only promote word 110 towards L-layer 146 once a predetermined frequency limit has been exceeded, making transfer of word 110 from relatively short to long term storage at one-time.

With reference still in FIG. 2 and in one example embodiment, when searching for a word 110 within hierarchical dictionary 105, L-layer 146 may be initially searched (step A). When the same word 110 has not been found in L-layer 146, consequently, S-layer 142 may be searched (step B). Alternatively, word 110 may be simultaneously searched on both S- and L-layers 142, 146.

Figure 3:
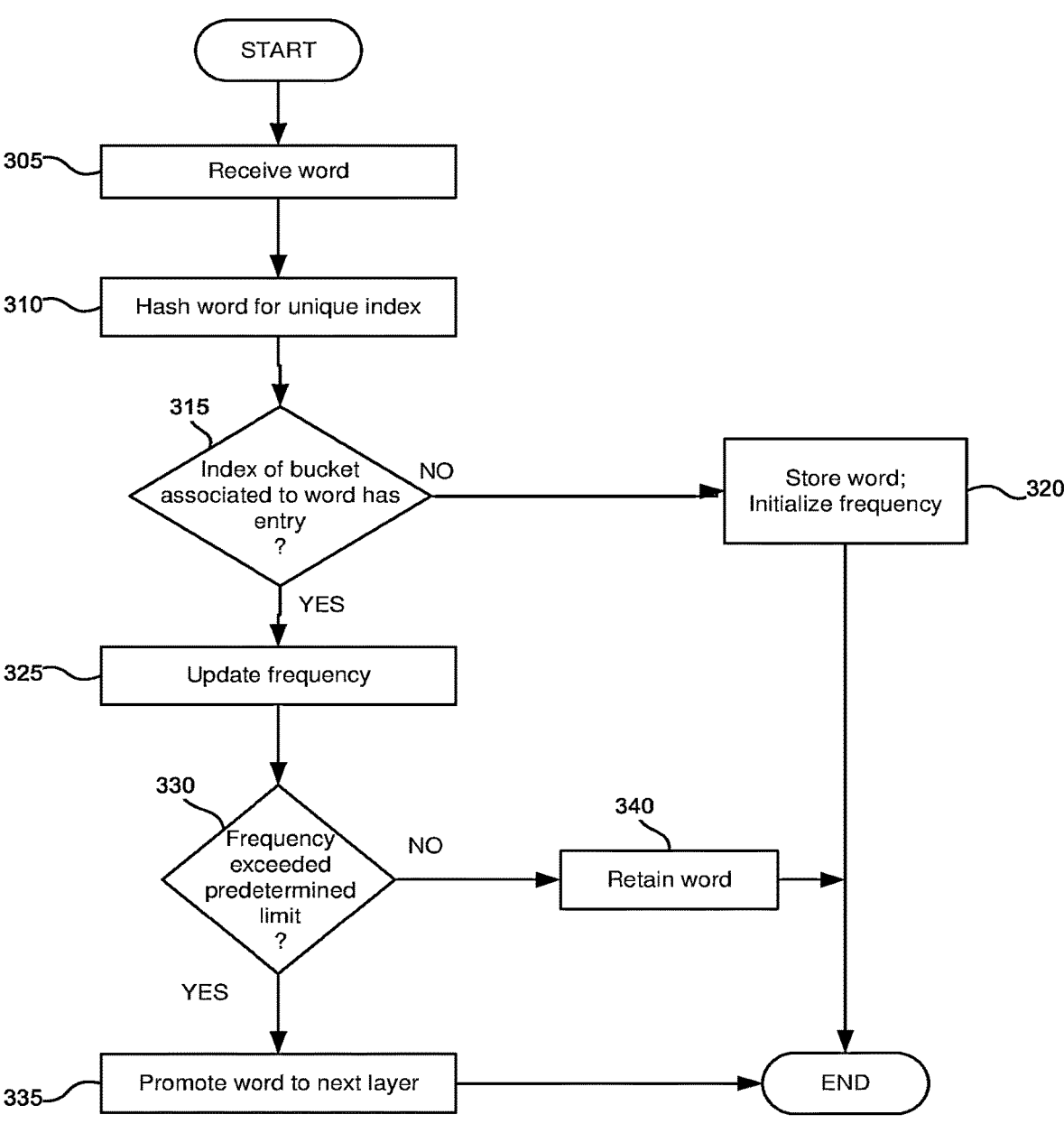
FIG. 3 is a flowchart detailing the steps of inserting a word to the hierarchical dictionary of FIG. 1, according to an example embodiment.

FIG. 3 is a flowchart detailing the steps of inserting word 110 to hierarchical dictionary 105. Program interface 130 may include program instructions to receive a request from a user of computing device 120 indicating word 110 to be inserted onto hierarchical dictionary 105. At block 305, each word 110 may either be retrieved from document 115 or received from processor 125. In one example embodiment, word 110 may be a portion of the content extracted from document 115. In another example embodiment, word 110 may be part of an input received from a user of program interface 130 not necessarily in relation to any document 115. In yet another example embodiment, word 110 may be automatically received or retrieved for insertion to hierarchical dictionary 105 when a controller of computing device 120 (not shown) has determined that word 110 is not included in hierarchical dictionary, as a result of a lookup process detailed in the steps of FIG. 4.

Blocks 310 to 325 recites steps typically performed for inserting a value into a hash map, as will be known in the art. For example, at block 310, a hash value corresponding to word 110 in block 305 may be identified. Identifying the hash value corresponding to word 110 may include determining, using a hash function with word 110 as the input value, a unique integer corresponding to word 110. The determined hash value is indicative of a unique index identifier for a position in a bucket of the hash map to which a pair of values is operative to be stored. In the present disclosure, each pair of values in the bucket comprises word 110 as well as a frequency thereof. At block 315, it is then determined whether the bucket position associated with the identified hash value contains an entry for checking whether word 110 is already within hierarchical dictionary 105. At block 320, upon a determination that the bucket position associated with the determined hash value is empty or that hierarchical dictionary 105 does not contain word 110, word 110 is stored into said bucket position. In storing word 110 into the bucket, a frequency thereof may be initialized. At block 325, upon a determination the bucket position associated with the determined hash value contains a pair of values, such that word 110 is already stored in the hierarchical dictionary, a frequency thereof also stored in the bucket is updated. Updating a frequency may include incrementing a frequency of word 110 stored in the bucket position.

In one example embodiment, steps in blocks 315 to 325 may be performed at both hash maps associated with S-layer 142 and M-layer 144. In another example embodiment, steps in blocks 315 to 325 may be initially performed in S-layer 142 and words 110 may be promoted or transferred to M-layer 144 following a predetermined period (e.g., when a new document 115 is being processed) or when a word 110 has reached a predetermined frequency limit for it to be promoted to M-layer 144 for storage at a longer period of time than when stored in S-layer 142.

At block 330, following updating of word frequency, the controller then determines whether the frequency of word 110 stored therein exceeds a predetermined limit, particularly, a limit for promotion to the next layer in hierarchical dictionary 105, and if so, at block 335, promotes word 110 to the next layer. Promoting word 110 to another layer includes transferring word 110 to a hash map associated with the next layer in the hierarchy and removing entries in the current layer associated with word 110. In the context for example where a word 110 is stored in S-layer 142 and the controller has determined that the frequency of word 110 has exceeded a predetermined frequency limit for words stored in the S-layer, word 110 is promoted to next layer M-layer 144. Similar steps will be apparent for promoting words from M-layer 144 to L-layer 146; however, word 110 has to exceed a second predetermined frequency limit substantially greater than the predetermined frequency limit in S-layer 142 for promotion from M-layer 144 to L-layer 146. Otherwise, at block 340, word 110 is retained in the current layer to which it is stored.

Figure 4:
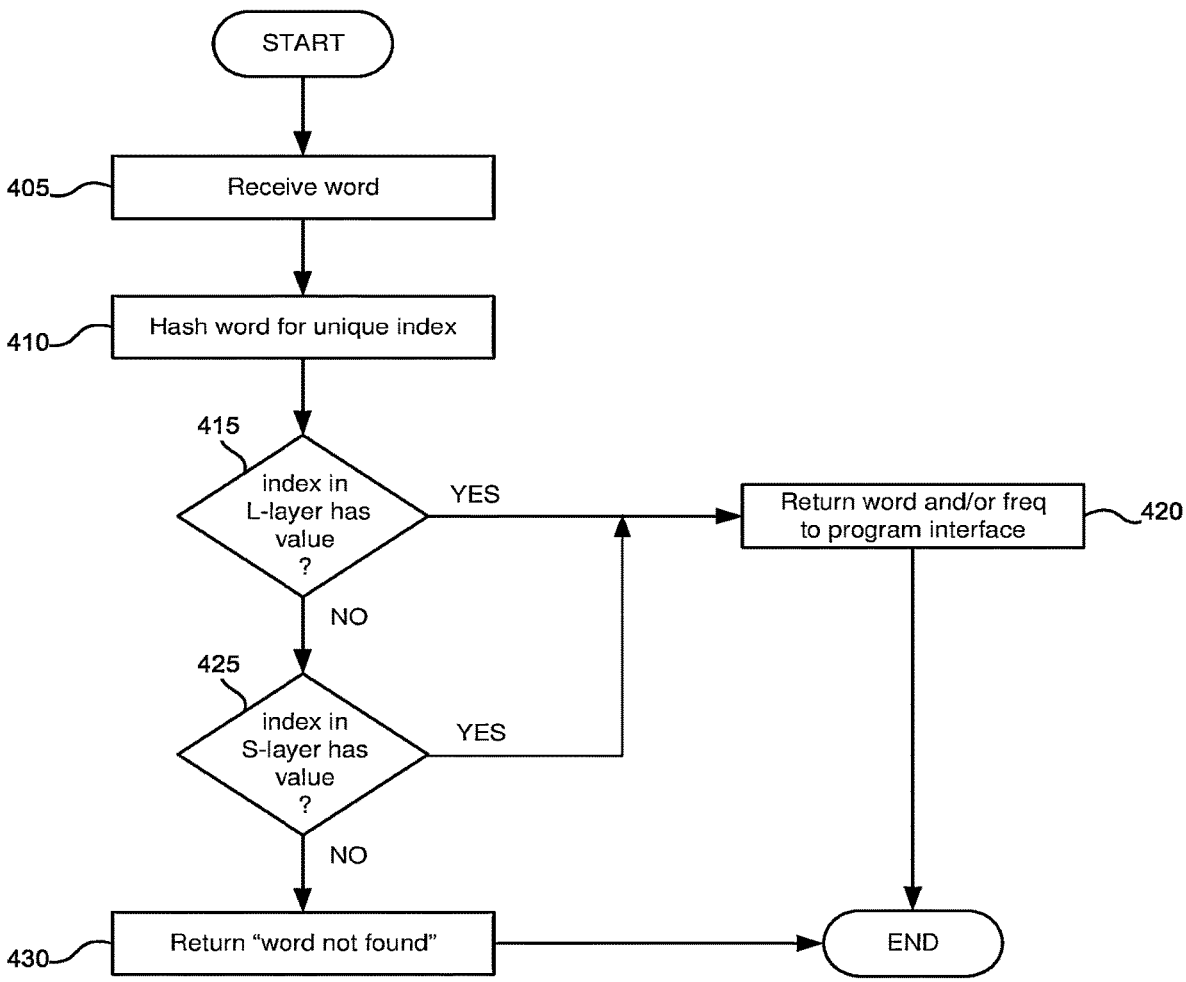
FIG. 4 is a flowchart detailing the steps of searching a word within the hierarchical dictionary of FIG. 1, according to an example embodiment.

FIG. 4 is a flowchart detailing the steps of searching words 110 within hierarchical dictionary 105. Program interface 130 may include program instructions to receive a request from a user of computing device 120 indicating word 110 to be searched. At blocks 405 and 410, respectively, word 110 is received and a hash value corresponding to word 110 is determined, similar to blocks 305 and 310 in FIG. 3.

At block 415, since the hash value is a unique identifier to a bucket position associated to a hash map in any of SML layers 142, 144, 146, the hash value determined at block 410 is used to determine whether the hash map in L-layer 146 associated with the hash value includes word 110.

At block 420, upon a determination that word 110 is stored at the specific bucket position in L-layer 146 corresponding to the hash value, one or more program instructions in hierarchical dictionary 105 may send a notification to computing device 120 indicating presence of word 110 in L-layer 146. In one example embodiment, hierarchical dictionary 105 may send word 110 and a frequency thereof indicated in the corresponding bucket to program interface 130 based upon a search request received therefrom. Otherwise, upon a determination that the bucket position in L-layer 146 corresponding to the hash value determined at block 410 does not include word 110, then at block 425, the controller may determine whether the hash map in S-layer 142 associated with the hash value includes word 110.

At block 425, upon a determination that word 110 is stored at the specific bucket position in S-layer 142 corresponding to the hash value determined at block 410, then, similar to block 415, hierarchical dictionary 105 may send word 110 and a frequency thereof to program interface 130 based upon a search request received therefrom. However, upon a determination that the bucket position in S-layer 142 corresponding to the hash value determined at block 410 does not include word 110, then at block 430, the controller may send a notification to computing device 120 indicating absence of word 110 in hierarchical dictionary 105. In addition, word 110, when found neither in S-layer 142 nor L-layer 146, may be inserted into hierarchical dictionary

105. Steps for inserting words to hierarchical dictionary 105, as detailed in FIG. 3, may be automatically performed for word 110 following determination of an absence thereof in the hierarchical dictionary of the present disclosure.

It will be appreciated that the actions described and shown in the example flowcharts may be carried out or performed in any suitable order. It will also be appreciated that not all of the actions described in FIGS. 3 and 4 need to be performed in accordance with the example embodiments and/or additional actions may be performed in accordance with other example embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computing device for organizing a plurality of words associated with a document, comprising:

a processor; and a memory storing instructions that, when executed by the processor, cause the processor to perform acts comprising:

obtaining, by the processor, the plurality of words;

storing, by the processor, the plurality of words in a first data structure stored in memory accessible to the processor, wherein the first data structure has a first word capacity;

updating, by the processor, a frequency of each of the plurality of words in the first data structure;

storing, by the processor, one or more words of the plurality of words in a second data structure stored in the memory accessible to the processor, wherein the second data structure has a second word capacity that is greater than the first word capacity; and ordering, by the processor, based upon the frequency, the one or more words relative to other words of the plurality of words;

gathering, by the processor, based on the ordering and instructions in the second data structure, statistics on the plurality of words;

filtering, by the processor and the instructions in the second data structure, the plurality of words stored in the first data structure and a third data structure by transferring, between the first data structure and a third data structure, the plurality of words based on the statistics on the plurality of words; and promoting, by the processor, based upon the ordering and the instructions in the second data structure, the one or more words to the third data structure after a predetermined period of time, wherein the predetermined period of time initiates in response to the one or more words reaching a predetermined frequency limit in the second data structure, wherein the third data structure is associated with a longer period of time than the second data structure and comprises a third word capacity that is greater than the second word capacity of the second data structure;

wherein the second data structure comprises a hash map augmented with a predecessor and a successor of a doubly linked list.

2. The computing device of claim 1, wherein the first data structure, the second data structure, and the third data structure comprise different hash maps, respectively, wherein the different hash maps comprise a different capacity limit, a different frequency limit, and a different time limit from one another.

3. The computing device of claim 1, wherein the first data structure and the third data structure are communicatively coupled to one another via the processor and the instructions in the second data structure.

4. The computing device of claim 1, wherein the processor with instructions in the second data structure filters between the plurality of words in the first data structure and the third data structure, between the first data structure and the second data structure, and between the second data structure and the third data structure.

5. The computing device of claim 1, wherein the doubly linked list tracks youngest words and oldest words being stored.

6. The computing device of claim 1, the acts further comprising:

clearing, by the processor, a set of words stored in the first data structure in response to processing another document.

7. The computing device of claim 1, wherein a capacity limit of the first data structure is up to a single document, a capacity limit of the second data structure is up to 10 to 100 documents, and a capacity limit of the third data structure is larger than the capacity limit of the second data structure.

8. The computing device of claim 1, wherein the instructions in the second data structure statistically filter the plurality of words in the first data structure and the third data structure by transferring a first set of words in the first data structure that exceed a predetermined limit to the third data structure and retaining a second set of words in the first data structure and the third data structure.

9. A method performed by a processor of a computing device for organizing a plurality of words associated with a document, the method comprising:

obtaining, by the processor, the plurality of words;

for each of the plurality of words:

storing, by the processor, a word in the plurality of words in a first data structure stored in memory accessible to the processor, wherein the first data structure has a first word capacity;

updating, by the processor, a frequency of the word in the first data structure;

storing, by the processor, the word in a second data structure stored in a memory accessible to the processor, wherein the second data structure has a second word capacity that is greater than the first word capacity; and ordering, by the processor, based upon the frequency, the word relative to other words of the plurality of words;

promoting, by the processor, based upon the ordering, the word to a third data structure at a longer period of time than when stored in the second data structure after a predetermined period of time that initiates in response to the word reaching a predetermined frequency limit in the second data structure, wherein the third data structure has a third word capacity that is greater than the second word capacity of the second data structure;

gathering, by the processor, based upon the ordering and instructions in the second data structure, statistics on each of the plurality of words in the document; and filtering, by the processor and the second data structure, the plurality of words stored in the first data structure and the third data structure by transferring the plurality of words between the first data structure and the third data structure based on the statistics on each of the plurality of words.

10. The method of claim 9, further comprising:

determining via the instructions of the second data structure, whether to transfer one or more of the plurality of words from the first data structure to the second data structure based on a first predetermined period and from the second data structure to the third data structure based on a second predetermined period of time that is different from the first predetermined period of time.

11. The method of claim 9, further comprising:

receiving a search request for the word;

identifying a hash value corresponding to the word;

using the hash value, determining whether the hash value has an associated entry in the third data structure;

upon a positive determination, responding to the search request with the word; and upon a negative determination, determining whether the hash value has an associated entry in the first data structure and sending a notification based on the determination.

12. The method of claim 9, further comprising:

filtering the plurality of words between the first data structure and the third data structure, between the first data structure and the second data structure, and between the second data structure and the third data structure based on different time periods associated with the first data structure, the second data structure and the third data structure, respectively.

13. The method of claim 9, further comprising:

statistically filtering, via the second data structure based on the statistics gathered by the instructions in the second data structure, the plurality of words in the first data structure and the third data structure by transferring a first set of words in the first data structure that exceed a predetermined limit to the third data structure and retaining a second set of words in the first data structure and the third data structure.

14. The method of claim 13, wherein the predetermined limit comprises a time limit.

15. A non-transitory computer-readable storage medium storing instructions that, when executed by a processor, cause the processor to perform acts comprising:

obtaining, by the processor, a plurality of words;

storing, by the processor, the plurality of words in a first data structure stored in memory accessible to the processor, wherein the first data structure has a first word capacity;

updating, by the processor, a frequency of each of the plurality of words in the first data structure;

storing, by the processor, one or more words of the plurality of words in a second data structure stored in a memory accessible to the processor, wherein the second data structure has a second word capacity that is greater than the first word capacity; and ordering, by the processor, based upon the frequency, the one or more words relative to other words of the plurality of words;

gathering, by the processor, based on the ordering and instructions in the second data structure, statistics on the plurality of words;

filtering, by the processor and the instructions in the second data structure, the plurality of words stored in the first data structure and a third data structure by transferring, between the first data structure and a third data structure, the plurality of words based on the statistics on the plurality of words; and promoting, by the processor, based upon the ordering and the instructions in the second data structure, the one or more words to the third data structure after a predetermined period of time, wherein the predetermined period of time initiates in response to the one or more words reaching a predetermined frequency limit in the second data structure, wherein the third data structure is associated with a longer period of time than the second data structure and comprises a third word capacity that is greater than the second word capacity of the second data structure.

16. The non-transitory computer-readable storage medium of claim 15, the acts further comprising:

filtering, via the instructions in the second data structure, between the plurality of words in the first data structure and the third data structure and between the first data structure and the second data structure.

17. The non-transitory computer-readable storage medium of claim 15, the acts further comprising:

statistically filtering, via the second data structure based on the statistics gathered by the instructions in the second data structure, the plurality of words in the first data structure and the third data structure by transferring a first set of words in the first data structure that exceed a predetermined limit to the third data structure and retaining a second set of words in the first data structure and the third data structure.

18. The non-transitory computer-readable storage medium of claim 15, the acts further comprising:

determining via the instructions of the second data structure, whether to transfer one or more of the plurality of words from the first data structure to the second data structure based on a first predetermined period and a first frequency and from the second data structure to the third data structure based on a second predetermined period of time that is different from the first predetermined period of time and a second frequency.

19. The non-transitory computer-readable storage medium of claim 15, the acts further comprising:

inserting a value associated with the plurality of words into a first hash map of the first data structure, a second hash map of the second data structure and a third hash map of the third data structure, wherein each hash map comprises a different capacity limit, a different frequency limit, and a different time limit from one another.

20. The non-transitory computer-readable storage medium of claim 15, the acts further comprising:

communicating the plurality of words from the first data structure to the third data structure based on the instructions in the second data structure, the second data structure communicatively coupling the first data structure and the third data structure.

* * * * *